Aug. 9, 1932.  J. F. KEY  1,870,574
VALVE FOR TIRE INFLATORS
Filed March 23, 1929
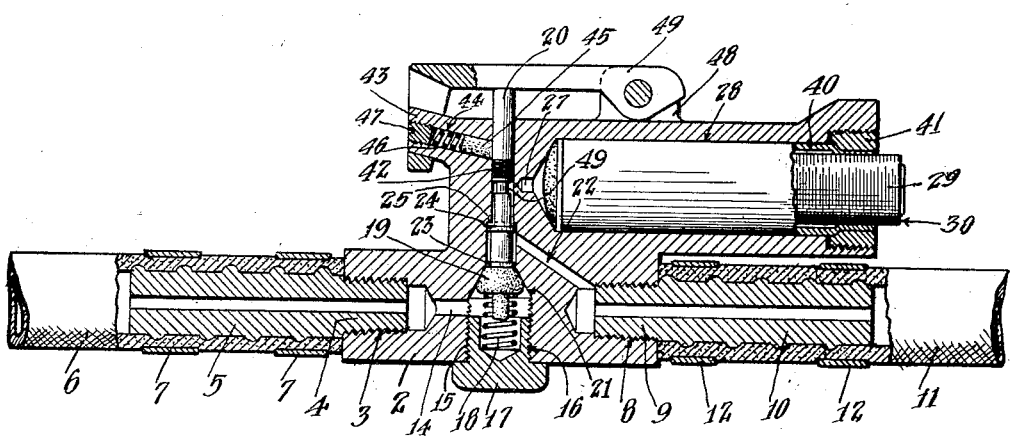
James Francis Key, Inventor
By Lyon & Lyon, Attorneys Patented Aug. 9, 1932

1,870,574

UNITED STATES PATENT OFFICE

JAMES FRANCIS KEY, OF PASADENA, CALIFORNIA, ASSIGNOR TO FIRST TRUST & SAVINGS BANK, OF PASADENA, AS TRUSTEE, OF PASADENA, CALIFORNIA

VALVE FOR TIRE INFLATORS

Application filed March 23, 1929. Serial No. 349,288.

This invention relates to a tire inflator and refers particularly to a device to be included upon or near the end of an air hose leading from an air pressure tank, which air hose is to be utilized for inflating automobile tires.

An object of the present invention is to provide a simple and exceedingly durable form of tire inflator operative to act as a valve for controlling the air supply to the air hose to a tire to be inflated and operative to register the pressure of the air in the tire.

More particularly an object of the present invention is to provide a tire inflator of the type in which an operating mechanism or valve of the inflator and the gauge of the inflator are included within one integral metallic body, arranged with means for connecting hose nipples thereto in such a manner that the inflator may be subjected to various rough usages, such as being run over by an automobile or the like, without danger to the inflator, the device being characterized by the provision of a main air supply valve, the operating stem of which communicates with the gauge chamber and carries packing which operates as a valve for shutting off the air pressure in the gauge chamber when the main valve is open.

A further object of the present invention is to provide a tire inflator in which there is a stem operated valve having an air packing member provided with suitable means for automatically lubricating the stem with graphite to assist both in lubricating the stem and packing the stem against air leaks.

Various further objects and advantages of the present invention will be apparent from a description of a preferred form or example of a tire inflator embodying the invention. For this purpose, there is hereafter described a preferred form or example of a tire inflator embodying the invention, the description being given in connection with the accompanying drawing, in which The figure represents an elevation mainly in vertical section of the tire inflator embodying the present invention.

Referring to the drawing, the tire inflator comprises a body 2 of metal which has at one end a threaded socket 3 for receiving the threaded pin 4 of an air hose nipple 5 which, in practice, is attached to an air hose 6 by suitable clamping means 7. The body 2 is also provided with a socket 8 axially aligned with the threaded socket 3 on the opposite end, which threaded socket 8 receives the pin 9 of a second air nipple 10 which, in practice, is connected with a piece of air hose 11 clamped to the nipple 10 by the clamping means 12.

In practice, the air hose 6 leads from a source of air pressure, such as an air pressure tank, and the hose 11 or the short section of hose, usually approximately three feet in length, leading to a device for unseating a tire valve and making connection with the tire valve stem. Devices of the latter class are well known in this art. When so constructed, the pressure of the tire to be inflated is imposed on the section of hose 11 and through the nipple 10, onto the passages within the body 2.

Leading from the socket 3 is an air passage 14 which connects with a vertical bore 15 in the body of the tubing, which extends completely through the valve body 2. The lower end of the bore 15 is enlarged and threaded, as indicated at 16, to receive a cap 17 which also operates as a seat for a spring 18.

The spring 18 is a coiled spring, the opposite end of which contacts with a valve head 19, preferably of rubber, which is mounted upon a valve stem 20 slidable in the upper reduced portion of the vertical bore 15. Between the threaded section 16 and the upper reduced portion of the bore there is provided a tapered section 21 which operates as a valve seat for the valve 19.

Above the valve seat 21 an air passage 22 is provided leading from the bore 15 to the socket 8.

The valve head 19 is preferably composed of rubber and is held on the valve stem 20 by a flange 23. A further flange 24 is indicated on the stem 20, the flanges 23 and 24 operate as guides for the stem and the flange 24 further operating as a stop means for limiting the upward travel of the stem 20. For this purpose a small annular shoulder 25 is indicated in the bore 15.

The stem 20 is slightly smaller than the upper portion of the bore 15, so that the pressure of air on the tire in operation is imposed through the air passage 20 and through the bore 15, when the valve 19 is closed through a port 27 leading into a cylindrical chamber 28, which houses a gauge member 29.

The cylindrical recess 28 has an axis parallel to the axes of the hose nipples 5 and 10, so that the device is compact in character. The gauge 29 within the recess 28 may be of any of the well known forms of tire pressure measuring gauges which usually are provided with a graduated cylinder 30 within an outer shell 40. The outer shell 40 is indicated as having a threaded flange 41 threaded to the end of the cylindrical recess 28.

Above the port 27 the vertical stem 20 of the valve head is provided with a packing 42 of leather or other suitable material, which operates to prevent the escape of air from the bore 15. This packing 42 is also so disposed that when the stem 20 is pressed downwardly to open the valve 19 it, simultaneously with the opening of the valve 19, covers the port 27. By this construction, when air is flowing through the device into a tire, the pressure is off the gauge 29, thereby preventing danger to the gauge by the high pressure which may exist in the air pressure tank. The operating stem 20 is provided with a groove 49 below the packing 42 which normally uncovers the port 27 leading to the pressure gauge 29.

The upper end of the body is provided with a boss 43 which contains a bore 44 for holding a piston 45 of material such as graphite adapted to act as a lubricator and as a material for aiding in packing the stem 20 of the valve. The lubricator piston 45 is normally urged towards the stem by a small coil spring 46 engaging a cap 47 threaded to the outer end of the bore 44.

The upper end of the body 2 is provided with an ear or ears 48 to which is pivoted a lever 49, the underside of which engages the top of the stem 20 and serves as a means by which the stem 20 may be operated in use.

The gauge thus constructed may be operated by one hand supporting and grasping the gauge and with the palm of the hand positioned to press against the lever 49 and with the gauge 29 having its gauge 30 positioned to protrude from the body 2 in position where it may be readily read by an operator.

All parts of the gauge are solid in construction and the gauge is compact and simple, whereby it may be subjected to repeated rough usage without danger of being damaged thereby.

While the particular form of tire inflator herein described is well adapted to carry out the objects of the present invention, changes and modifications may be made without departing from the principles of the invention and this invention includes all such changes and modifications as come within the scope of the appended claim.

I claim:

A valve for a tire inflator comprising a body forming a vertical air passage, a valve operative within the air passage and having a vertically extending operating stem, a vertical bore in said body constituting a reduced extension of the air passage in which said operating stem is disposed, a port connecting with said vertical bore, a groove in said operating stem normally uncovering said port but disposed to move by said port and permit said operating stem to cover said port when it is depressed to open the valve, a threaded socket at the opposite end of said vertical bore from that receiving said operating stem, and a cap threaded to said socket and forming a seat for a spring of said valve, and a packing means forming part of the operating stem of the valve and disposed normally above said port and adapted to cover said port in the depressed position of the operating stem.

Signed at Los Angeles, California, this 14th day of March, 1929.

JAMES FRANCIS KEY.